United States Patent
Xu et al.

(10) Patent No.: US 12,132,652 B2
(45) Date of Patent: Oct. 29, 2024

(54) RIFT PROTOCOL-BASED NETWORK LOGICAL LAYERING METHOD AND DEVICE, NETWORK DEVICE AND STORAGE MEDIUM

(71) Applicant: ZTE CORPORATION, Guangdong (CN)

(72) Inventors: Benchong Xu, Guangdong (CN); Huilai Wang, Guangdong (CN); Shaofu Peng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 626 days.

(21) Appl. No.: 17/434,752

(22) PCT Filed: Feb. 20, 2020

(86) PCT No.: PCT/CN2020/075952
§ 371 (c)(1),
(2) Date: Aug. 29, 2021

(87) PCT Pub. No.: WO2020/177540
PCT Pub. Date: Sep. 10, 2020

(65) Prior Publication Data
US 2022/0166710 A1    May 26, 2022

(30) Foreign Application Priority Data
Mar. 1, 2019    (CN) .......................... 201910157607.3

(51) Int. Cl.
*H04L 45/02*    (2022.01)
*H04L 45/48*    (2022.01)

(52) U.S. Cl.
CPC .............. *H04L 45/48* (2013.01); *H04L 45/02* (2013.01)

(58) Field of Classification Search
CPC ......... H04L 45/02; H04L 45/64; H04L 45/48; H04L 41/12; H04L 41/22
See application file for complete search history.

(56) References Cited

U.S. PATENT DOCUMENTS

2009/0252058 A1    10/2009    Chen et al.
2013/0103739 A1*    4/2013    Salgueiro ................ H04L 45/02
                                                                  709/203
2016/0359699 A1*    12/2016    Gandham ............... H04L 43/08

FOREIGN PATENT DOCUMENTS

CN    102164081 A    8/2011
CN    103078798 A    5/2013
(Continued)

OTHER PUBLICATIONS

China Patent Office, First Office Action issued Mar. 3, 2022 for application No. CN201910157607.3.
(Continued)

*Primary Examiner* — Anez C Ebrahim
(74) *Attorney, Agent, or Firm* — Li & Cai Intellectual Property (USA) Office

(57) ABSTRACT

Embodiments of the present disclosure provide a network logical layering method based on Routing In Fat Tree (RIFT) protocol, a network logical layering device, a network device and a storage medium. By exchanging Link Information Element (LIE) packets and Topology Information Element (TIE) packets with other devices, a network device can enable the other devices in the network to know a topology supported by the present device and to know neighbor information and Metric information of the present device in the supported topology, and the network device can also know the topologies supported by the other devices in the network and the neighbor information and the Metric information of the other devices in the corresponding
(Continued)

---

S102 — send an LIE packet and a TIE packet to other devices in a network, and receive LIE packets and TIE packets sent by the other devices in the network S104 — perform network logical layering based on the LIE packets and the TIE packets received by a present device topologies. Thus, the device can calculate a topology route corresponding to the topology supported thereby.

14 Claims, 6 Drawing Sheets

(56) References Cited

FOREIGN PATENT DOCUMENTS

| CN | 103825827 A | 5/2014 |
|---|---|---|
| CN | 105591932 A | 5/2016 |
| CN | 107689915 A | 2/2018 |
| WO | 2018145761 A1 | 8/2018 |

OTHER PUBLICATIONS

Tony Przygienda, et al.: "RIFT: Routing in Fat Trees", RIFT working group, Oct. 19, 2018.

S. Previdi, et al.: "IS-IS Multi-Instance", Internet Engineering Task Force (IETF), Dec. 31, 2012.

T Przygienda, et al.: "M-ISIS: Multi Topology (MT) Routing in Intermediate System to Intermediate Systems (IS-ISs)", Network Working Group, Feb. 28, 2008.

WIPO, International Search Report issued on Apr. 30, 2020.

China Patent Office, Second Office Action issued Aug. 17, 2022 for application No. CN201910157607.3.

European Patent Office, The extended European search report issued Oct. 10, 2022 for application No. EP20766989.6.

Przygienda T et al: "RIFT: Routing in Fat Trees; draft-przygienda-rift-04.txt", Internet Draft: RIFT Working Group, IETF, Jan. 11, 2018.

The RIFT Authors: "Internet-Draft "Heaven is under our feet as well as over our heads" Intended status: Standards Track; draft-ietf-rift-rift-03.txt", Internet Draft: RIFT Working Group, IETF, Oct. 20, 2018.

Banerjee Cisco Systems D Ward Juniper Networks A: "Extensions to IS-IS for Layer-2 Systems; rfc6165.txt", IETF, Apr. 14, 2011.

\* cited by examiner

```
send an LIE packet and a TIE packet to other devices in     S602
a network, and receive LIE packets and TIE packets sent
by the other devices in the network
```

```
perform network logical layering based on the LIE           S604
packets and the TIE packets received by a present
device
```

RIFT PROTOCOL-BASED NETWORK LOGICAL LAYERING METHOD AND DEVICE, NETWORK DEVICE AND STORAGE MEDIUM

The present disclosure claims priority to the Chinese Patent Application No. 201910157607.3 filed on Mar. 1, 2019, the entire contents of which are incorporated herein by reference.

TECHNICAL FIELD

The present disclosure relates to the field of communications, and in particular, to a network logical layering method based on Routing In Fat Tree (RIFT) protocol, a network logical layering device, a network device and a storage medium.

BACKGROUND

Routing In Fat Tree (RIFT) is emerging as a routing protocol designed for a fat tree topology. The fat tree topology has been widely applied to data center networks, and can also be used in the fields of metropolitan area networks, bearer networks, and the like. Compared with traditional routing protocols, the RIFT protocol has the following advantages: inherently preventing loops, supporting Zero Touch Provisioning (ZTP), convenient to deploy, supporting network self-inspection, being capable of greatly reducing the number of routing tables of underlying devices, supporting high-level Equal-Cost Multi-Path Routing (ECMP) and the like.

However, the RIFT protocol does not support logical layering of a network based on multiple topologies or multiple instances. Therefore, it is necessary to provide a technical solution for performing logical layering on a network under the RIFT protocol.

SUMMARY

Embodiments of the present disclosure provide an RIFT protocol-based network logical layering method, a network logical layering device, a network device and a computer-readable storage medium, so as to solve the problems of how to achieve network logical layering based on multiple topologies under the RIFT protocol and how to achieve network logical layering based on multiple instances under the RIFT protocol.

An embodiment of the present disclosure provides an RIFT protocol-based network logical layering method, including:

sending a Link Information Element (LIE) packet and a Topology Information Element (TIE) packet to other devices in a network, and receiving LIE packets and TIE packets sent by the other devices in the network, the LIE packet being capable of indicating a topology identifier (ID) of at least one topology supported by a source device which sends the packet, the TIE packet including neighbor information carrying a target topology ID and Metric information carrying the target topology ID, and the target topology ID being the topology ID indicated by the LIE packet corresponding to the TIE packet; and performing network logical layering based on the LIE packets and the TIE packets received by a present device.

An embodiment of the present disclosure further provides an RIFT protocol-based network logical layering method, including:

sending an LIE packet and a TIE packet to other devices in a network, and receiving LIE packets and TIE packets sent by the other devices in the network, each of the LIE packet and the TIE packet including an instance ID option which carries an instance ID of at least one instance supported by a source device which sends the packet; and performing network logical layering based on the LIE packets and the TIE packets received by a present device.

An embodiment of the present disclosure further provides a network logical layering device, including:

a first packet transceiver module configured to send an LIE packet and a TIE packet to other devices in a network, and receive LIE packets and TIE packets sent by the other devices in the network; the LIE packet is capable of indicating a topology ID of at least one topology supported by a source device which sends the packet, the TIE packet includes neighbor information carrying a target topology ID and Metric information carrying the target topology ID, and the target topology ID is the topology ID indicated by the LIE packet corresponding to the TIE packet; and a first layering processing module configured to perform network logical layering based on the LIE packets and the TIE packets received by a present device.

An embodiment of the present disclosure further provides a network logical layering device, including:

a second packet transceiver module configured to send an LIE packet and a TIE packet to other devices in a network, and receive LIE packets and TIE packets sent by the other devices in the network; each of the LIE packet and the TIE packet includes an instance ID option which carries an instance ID of at least one instance supported by a source device which sends the packet; and a second layering processing module configured to perform network logical layering based on the LIE packets and the TIE packets received by a present device.

An embodiment of the present disclosure further provides a network device, including a processor, a memory and a communication bus;

the communication bus is configured to enable connection and communication between the processor and the memory; and the processor is configured to execute a first network logical layering program stored in the memory, so as to perform steps of the RIFT protocol-based network logical layering method stated above firstly; and/or the processor is configured to execute a second network logical layering program stored in the memory, so as to perform steps of the RIFT protocol-based network logical layering method stated above secondly.

An embodiment of the present disclosure further provides a computer-readable storage medium having at least one of a first network logical layering program and a second network logical layering program stored thereon, the first network logical layering program is capable of being executed by one or more processors to perform the steps of the RIFT protocol-based network logical layering method stated above firstly, the second network logical layering program is capable of being executed by one or more processors to perform the steps of the RIFT protocol-based network logical layering method stated above secondly.

According to the RIFT protocol-based network logical layering method, the network logical layering device, the network device and the computer-readable storage medium provided by the embodiments of the present disclosure, on the one hand, the network device sends the LIE packet and the TIE packet to the other devices in the network, receives the LIE packets and the TIE packets sent by the other devices in the network, and then determines the topology route corresponding to the topology supported by the present device based on the LIE packets and the TIE packets received by the present device, thereby achieving network logical layering. The LIE packet is capable of indicating the topology ID of at least one topology supported by the source device which sends the packet, the TIE packet includes the neighbor information carrying the target topology ID and the Metric information carrying the target topology ID, and the target topology ID is the topology ID carried in the LIE packet corresponding to the TIE packet, and thus by exchanging the LIE packets and the TIE packets with the other devices in the network, the network device can enable the other devices in the network to know the topology supported by the present device and the neighbor information and the Metric information of the present device in the supported topology, and the network device can also know the topologies supported by the other devices in the network and the neighbor information and the Metric information of the other devices in the corresponding topologies. Therefore, the network device can calculate the topology route corresponding to the topology supported thereby, and the other devices can also calculate the topology routes of the topologies supported thereby. In the network logical layering solutions provided by the embodiments of the present disclosure, the topology ID is introduced into the LIE packet and the TIE packet, and the topologies can be distinguished from each other according to the topology IDs when the network device supports more than one topology, which allows network logical layering based on multiple topologies, thereby facilitating optimized allocation of communication resources and increasing utilization of communication resources.

On the other hand, each of the LIE packet and the TIE packet exchanged between the network device and the other devices in the network includes the instance ID option which carries the instance ID of at least one instance supported by the source device which sends the packet, that is, the instances supported by the respective devices in the network may vary. After the network device receives the LIE packets and the TIE packets sent by other devices, the network device can determine the instances supported by the other devices. Since packets cannot be transmitted between the devices in different instances, each device in the network can determine at least two routing tables based on the received LIE packets and TIE packets due to the different instances, so as to achieve logical layering of the network based on the different instances, thereby improving optimal configuration of the network.

DETAILED DESCRIPTION

The embodiments of the present disclosure are further described in detail below with reference to the specific implementations and the accompanying drawings. It should be understood that the specific implementations described herein are merely intended to explain the present disclosure, rather than limiting the present disclosure.

Multiple topologies are often needed in some actual scenarios. For example, in the case where a multicast function is deployed in merely some devices in a network, and other devices do not support the multicast function, multiple topologies are used to perform logical layering on the network to create a multicast topology for the devices which support the multicast function, so that the multicast function can be used in these devices. As another example, in a network where an Internet Protocol Version 6 (IPv6) function is not deployed in all nodes, multiple topologies can be used to create an IPv6 topology for allowing the devices in which the IPv6 function is deployed to communicate based on the IPv6.

Figure 1:
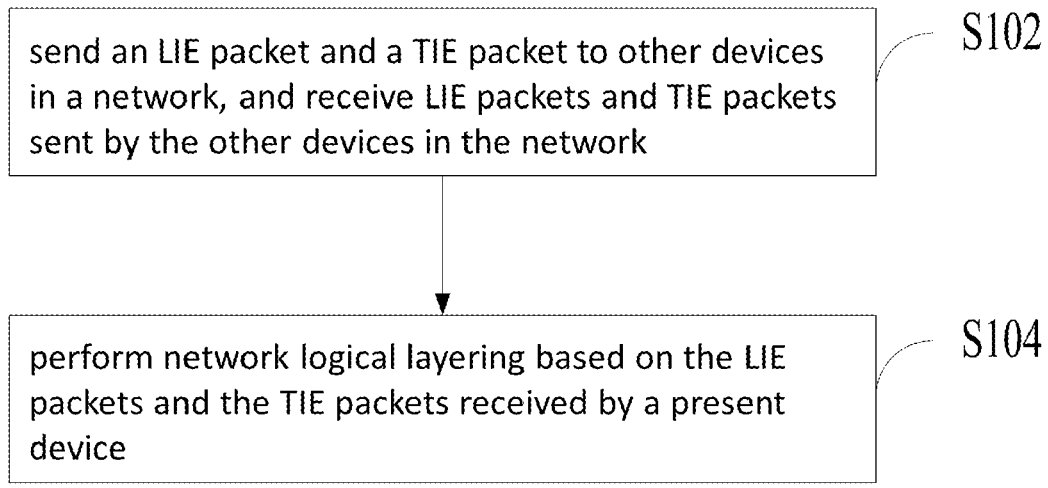
FIG. 1 is a flowchart illustrating an RIFT protocol-based network logical layering method according to an embodiment of the present disclosure.

Multiple topologies can be used to logically layer a network, so as to allow transmission of different communication data through different topology routes, thereby improving optimized allocation and utilization of communication resources. However, the RIFT protocol does not support multi-topology implementation of a same instance, which reduces the utilization of the communication resources, hinders the optimized allocation of the communication resources, and limits the application of the RIFT protocol. In order to solve the above problem, An embodiment provides an RIFT protocol-based network logical layering method. As shown in FIG. 1 which is a flowchart illustrating of an RIFT protocol-based network logical layering method, the method includes following steps S102 and S104.

S102: sending an LIE packet and a TIE packet to other devices in a network, and receiving LIE packets and TIE packets sent by the other devices in the network.

In the embodiment, a network device can send an LIE packet and a TIE packet to other devices in the network, and can also receive LIE packets and TIE packets sent by the other devices in the network. It should be understood that the time sequence of sending the LIE packet and the TIE packet by the network device and receiving the LIE packets and the TIE packets by the network device from the other devices is not fixed in the embodiment, the network device may first send the LIE packet and the TIE packet to the other devices, and then receive the LIE packets and the TIE packets from the other devices in some scenarios; and the network device may first receive the packets, and then send the packets in some other scenarios. The sending the LIE packet and the TIE packet and the receiving the LIE packets and the TIE packets may also be performed simultaneously.

The LIE packets and the TIE packets which are exchanged between the network devices in the embodiment are described below.

The LIE packet is capable of indicating a topology ID of at least one topology supported by a source device which sends the packet. It should be understood that the source device refers to the network device which generates and sends the LIE packet, as shown in the schematic diagram in FIG. 2.

Figure 2:
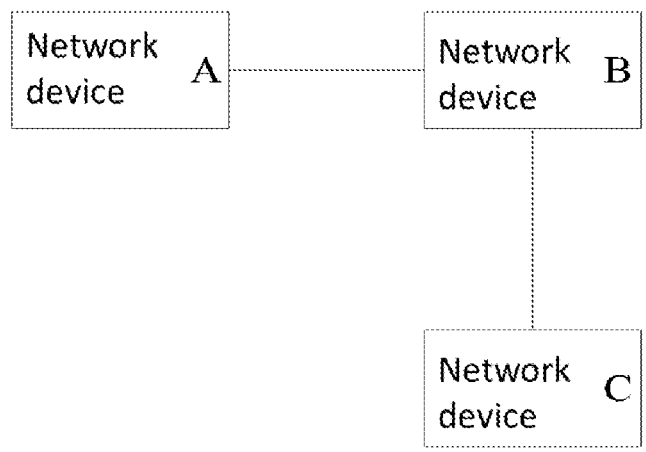
FIG. 2 is a schematic diagram of a network architecture according to an embodiment of the present disclosure.

In a network shown in FIG. 2, a network device A generates and sends an LIE packet to a network device B, and then the network device B may forward the LIE packet sent by the network device A to a network device C. However, even if the network device B sends the LIE packet, the network device B is not the source device of the LIE packet. The source device of the LIE packet should be the network device A which generates and sends the LIE packet.

It should be understood that more than one topology exists in a network, that is, logical layering of the network may be implemented based on multiple topologies. In some examples of the embodiment, the LIE packet may include a topology ID of at least one topology supported by the source device. In an example, the source device supports other topologies in addition to a default topology, so that a topology ID carried in an LIE packet sent by the source device may be a topology ID of at least one of the other topologies supported by the source device. For example, a network device supports two topologies, the topology IDs of which are "0" and "1" respectively. The topology with the topology ID of "0" is a topology supported by all the devices in the network by default, while the topology with the topology ID of "1" is only supported by some of the devices in the network. In such example, an LIE packet sent by the network device may only include the topology ID of "1", because the other devices in the network know that the network device also supports the topology with the topology ID of "0" even if the LIE packet does not carry the topology ID of "0".

In some other examples of the embodiment, the LIE packet may include topology IDs of all the topologies supported by the source device. For example, topology IDs of the topologies supported by a network device are "0", "1" and "3", then an LIE packet sent by the network device as a source device can include all the topology IDs of "0", "1" and "3".

Figure 3:
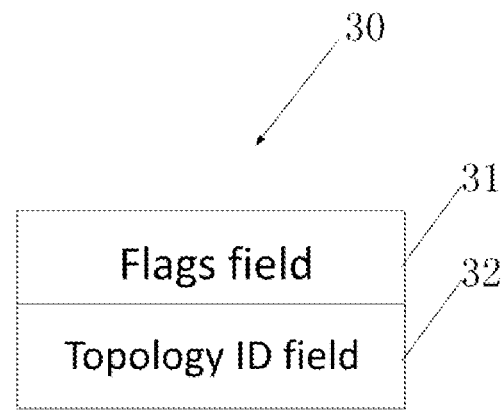
FIG. 3 is a schematic structural diagram of a topology ID option according to an embodiment of the present disclosure.

The LIE packet carries a topology ID option, through which the LIE packet indicates the topology supported by the source device. FIG. 3 is a schematic structural diagram of a topology ID option according to the embodiment.

The topology ID option 30 includes a Flags field 31 capable of indicating that the content carried in the following field is the topology ID, and a Topology ID field 32. In the embodiment, the Flags field 31 has a length of one byte, and may contain some preserved bits for subsequent function extension. A length of the topology ID field 32 may be set to two bytes in which the topology ID of the topology supported by the source device is carried.

According to the above description, if an LIE packet sent by a network device does not carry any topology ID option, it is indicated that the network device only supports a default topology.

The TIE packet includes neighbor information and Metric information. In the embodiment, each of the neighbor information and the Metric information in the TIE packet carries a target topology ID which is the topology ID indicated by a corresponding LIE packet. An LIE packet and a TIE packet sent by one network device as a source device are related to each other, because the LIE packet is capable of indicating a topology ID of a topology supported by the source device for other devices in the network, and the TIE packet is capable of indicating neighbor information and Metric information of the source device under the topology ID for the other devices in the network. In the embodiment, the LIE packet and the TIE packet are described as being corresponding to each other.

Therefore, the topology IDs carried by the neighbor information and the Metric information in the TIE packet are both the topology ID indicated by the corresponding LIE packet. In the embodiment, the TIE packet includes a Node TIE packet containing the neighbor information carrying the target topology ID, and a Prefix TIE packet containing the Metric information carrying the target topology ID.

Figure 4:
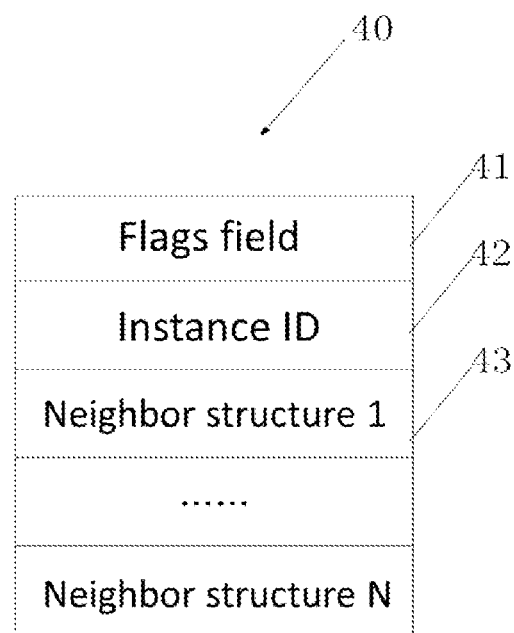
FIG. 4 is a schematic structural diagram of a neighbor option carrying a target topology ID according to an embodiment of the present disclosure.

The neighbor information in the TIE packet may be carried through a neighbor option. FIG. 4 shows a neighbor option carrying a target topology ID. The neighbor option 40 includes a Flags field 41 and a topology ID field 42, and further includes a Neighbor structure 43. The neighbor option 40 shown in FIG. 4 carries the information of M neighbors. In the embodiment, the Flags field 41 and the topology ID field 42 in the neighbor option 40 are similar to those illustrated by FIG. 3, and thus are not repeated here.

Figures 5, 6:
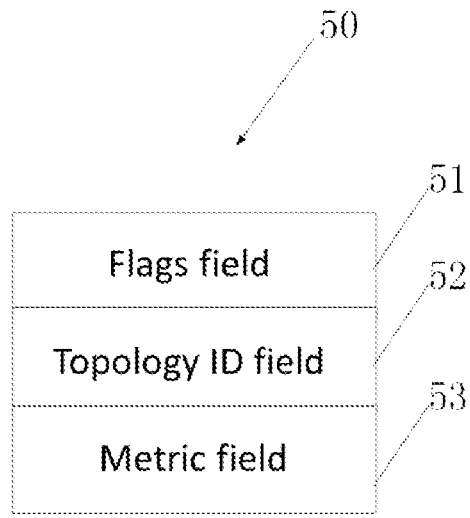
FIG. 5 is a schematic structural diagram of a Metric option according to an embodiment of the present disclosure.
FIG. 6 is a flowchart illustrating an RIFT protocol-based network logical layering method according to an embodiment of the present disclosure.

The Metric information in the TIE packet may be carried through a Metric option. FIG. 5 is a schematic structural diagram of a Metric option. The Metric option 50 includes a Flags field 51 and a topology ID field 52, and the Flags field 51 and the topology ID field 52 in the Metric option 50 are similar to those illustrated by FIGS. 3 and 4, and thus are not repeated here. Moreover, the Metric option 50 further includes a Metric field 53 carrying the Metric information.

In an example of the embodiment, in order to send the LIE packet and the TIE packet as described above to the other devices in the network, the network device can establish a mapping relationship between an interface thereof and a topology supported thereby, that is, binding the interface to the supported topology. For example, a network device which supports two topologies with topology IDs of "1" and "2" can bind the topology with the topology ID of "1" to an interface a of the network device, and bind the topology with the topology ID of "2" to an interface b of the network device. It should be understood that one interface can be bound to two or even more topologies by the network device in some other examples of the embodiment.

By binding the interface to the topology, an LIE packet sent through the interface carries a topology ID of the topology corresponding to the interface, and a TIE packet sent through the interface includes neighbor information and Metric information, both of which carry the corresponding topology ID.

S104: performing network logical layering based on the LIE packets and the TIE packets received by a present device.

After receiving the LIE packets and the TIE packets sent by the other devices in the network, the present device can determine which devices support the same or partially the same topologies as the present device based on the received LIE packets and TIE packets, and then calculate and determine a topology route corresponding to the target topology ID based on the obtained neighbor information carrying the target topology ID and the obtained Metric information carrying the target topology ID.

It should be understood that a network device which supports multiple topologies needs to separately determine topology routes for the multiple topologies during the route determination, so as to determine a topology route for each topology. For example, assuming that a network device supports two topologies with topology IDs of "1" and "2", when the network device performs route determination based on the LIE packets and the TIE packets received from other devices, the network device needs to respectively calculate one topology route for the topology with the topology ID of "1" and one topology route for the topology with the topology ID of "2".

After the network device determines the topology route corresponding to each topology supported thereby, if the network device is required to transmit data through a certain topology, the network device can search for a forwarding path based on the already determined corresponding topology route to achieve data transmission.

The RIFT protocol-based network logical layering method provided by the embodiment can be performed by a network device in a network. It should be understood that each network device in the network can perform the RIFT protocol-based network logical layering method, so as to determine a topology route corresponding to the topology supported by the network device.

With the RIFT protocol-based network logical layering method according to the embodiment of the present disclosure, the network device in the network adds the topology ID capable of indicating the topology supported thereby to the LIE packet, and carries the topology ID of the topology supported thereby through the neighbor information and the Metric information in the TIE packet, so as to allow the other devices in the network to know the topology supported by the device and to know the neighbor information and the Metric information of the present device in the supported topology; meanwhile, the present device can also know the topologies supported by the other devices through the LIE packets and the TIE packets sent by the other devices, and know the neighbor information and the Metric information of the other devices in the corresponding topologies. Thus, each device in the network can determine the topology route of the topology supported thereby based on the obtained information, and logical layering of the network can be achieved based on multiple topologies, thereby optimizing allocation of network communication resources.

The RIFT protocol only supports distinguishing between different instances according to different User Datagram Protocol (UDP) port numbers, that is, a specific UDP port number is first assigned to a certain instance, and then the instances are distinguished from each other based on the UDP port numbers.

Since the UDP port numbers are a public resource, a UDP port number assigned to a certain instance by a user is prone to conflict with a well-known port number. Moreover, the well-known port numbers would change with the development of the protocol. Therefore, the use of the UDP port numbers for distinguishing between instances is not favorable for the compatibility of the RIFT protocol. In view of the above, An embodiment provides a solution for distinguishing between instances under the RIFT protocol. With reference to FIG. 6 which is a flowchart illustrating an RIFT protocol-based network logical layering method, the method includes following steps S602 and S604.

S602: sending an LIE packet and a TIE packet to other devices in a network, and receiving LIE packets and TIE packets sent by the other devices in the network.

In the embodiment, it is possible that the instances supported by the respective network devices in a network are consistent, in which case logical layering of the network can only be performed based on multiple topologies as described in the embodiment above. However, in some other examples of the embodiment, the instances supported by the respective network devices in a network may be not completely consistent, for example, some devices support an Instance 1, while the other devices support an Instance 2, in which case logical layering of the network can also be performed based on multiple instances.

In order to enable each network device in the network to perform logical layering of the network based on multiple instances, the LIE packet and the TIE packet sent by each network device may be configured in a new way.

Figure 7:
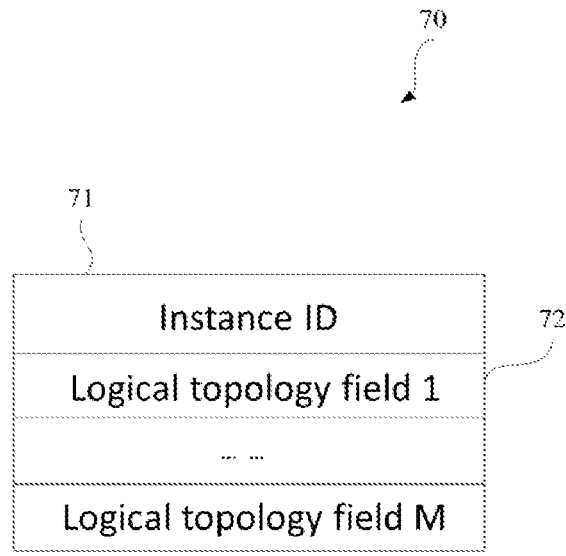
FIG. 7 is a schematic structural diagram of an instance ID option according to an embodiment of the present disclosure.

In the embodiment, each of the LIE packet and the TIE packet sent by the network device carries an instance ID option, and the LIE packets and the TIE packets received by each network device from the other devices also carry instance ID options. FIG. 7 is a schematic structural diagram of an instance ID option.

The instance ID option 70 includes an Instance ID field 71 and a logical topology field 72. The Instance ID field 71 includes an instance ID of at least one instance supported by the source device, and the logical topology field 72 may include at least one topology ID option of the source device in the supported instance, that is, the logical topology field 72 may include at least one topology ID option as shown in FIG. 3. For example, the instance ID option 70 shown in FIG. 7 includes N topology ID options. However, in some examples of the embodiment, the logical topology field 72 may not carry any topology ID option, which indicates that the source device only supports a default topology.

In the embodiment, in order to send the LIE packet carrying the instance ID option and the TIE packet carrying the instance ID option to the other devices in the network, the network device may first set a mapping relationship between an interface thereof and an instance, that is, binding the interface to the instance, and then send the LIE packet and the TIE packet through the interface bound to the corresponding instance. In this way, both the LIE packet and the TIE packet sent by the network device carry the corresponding instance ID options.

S604: performing network logical layering based on the LIE packets and the TIE packets received by a present device.

After receiving the LIE packets and the TIE packets sent by the other devices in the network, the network device can, based on the LIE packets and the TIE packets, determine which devices in the network support the same instances as the present device and also determine the topologies supported by these devices in the supported instances. Based on the obtained information, the network device can then determine a topology route of each supported topology in the supported instances.

Figure 8:
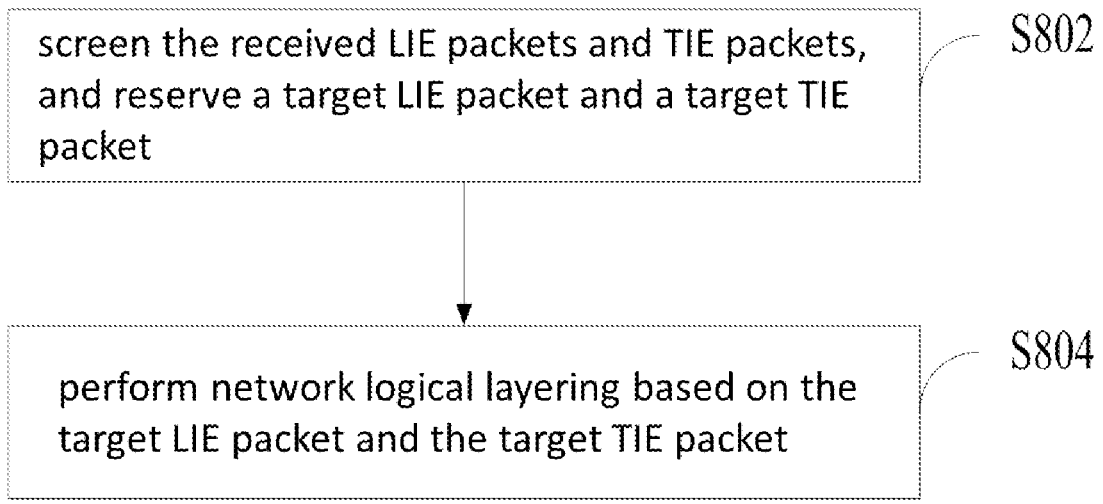
FIG. 8 is a flowchart illustrating a process of determining a topology route by a network device based on received LIE packets and TIE packets according to an embodiment of the present disclosure.

It should be understood that logical layering of a network can be performed based on instances when at least two instances exist in the network. Packets cannot be transmitted between instances. However, in some cases, one network device can support more than one instance at the same time. For example, a certain network device supports both an Instance 1 and an Instance 2 at the same time, and thus can receive both a packet of the Instance 1 and a packet of the Instance 2, but the network device does not need the LIE packets and the TIE packets of the Instance 2 when determining a topology route in the Instance 1, and similarly, the network device does not need the LIE packets and the TIE packets sent by the network devices in the Instance 1 when determining a topology route in the Instance 2. Therefore, for a certain supported instance, not all the LIE packets and the TIE packets received by the network device are useful. A solution for determining a topology route, including following steps S802 and S804, is described below with reference to FIG. 8.

S802: screening the received LIE packets and TIE packets, and reserving a target LIE packet and a target TIE packet.

In the embodiment, the target LIE packet refers to an LIE packet which carries an instance ID the same as an instance ID bound to the interface that receives the packet, and the target TIE packet refers to a TIE packet which carries an instance ID the same as an instance ID bound to the interface that receives the packet, and is sent by a neighboring device of the present device under the instance ID.

In an example, a certain network device which only supports an Instance 1 binds the Instance 1 to an interface a of the network device, and then the network device receives two groups of packets through the interface a; and the instance IDs in the instance ID options carried by the LIE packet and the LIE packet in the first group of packets are both "1", while the instance IDs in the instance ID options carried by the LIE packet and the TIE packet in the second group of packets are both "2". In such case, the network device only takes the LIE packet in the first group of packets as the target LIE packet corresponding to the Instance 1, and takes the TIE packet in the first group of packets as the target TIE packet corresponding to the Instance 1. Furthermore, when it is determined that the instance IDs carried in the second group of packets are not consistent with the instance ID bound to the interface a that receives the packets, the network device may directly discard the second group of packets, that is, discard the LIE packet and the TIE packet in the second group of packets.

In addition, in the example, for determining the target TIE packet by the network device, it is required that the instance ID carried by the target TIE packet is consistent with the instance ID of the instance bound to the interface of the network device that receives the packet, and it is further required that the packet is sent by a neighbor of the network device. In some cases, a TIE packet would be discarded by the network device because the source device of the TIE packet is not a neighbor of the network device, even if the TIE packet carries the required instance ID.

S804: performing network logical layering based on the target LIE packet and the target TIE packet.

After the target LIE packet and the target TIE packet are screened out, the network device can determine a topology route of each topology in the instance supported by the present device based on the target LIE packet and the target TIE packet. For example, a certain network device only supports an Instance 1 and supports a Topology 1 and a Topology 2 in the Instance 1, so the topology routes to be finally determined by the network device include a topology route of the Topology 1 in the Instance 1 and a topology route of the Topology 2 in the Instance 1.

With the RIFT protocol-based network logical layering method according to the embodiment, each of the LIE packet and the TIE packet sent by each network device in the network carries an instance ID option which indicates, for the other devices in the network, the instance supported by the present device and the topology supported by the present device in the supported instance. Each network device is aware of the instances and the topologies supported by the other devices through exchanging the LIE packets and the TIE packets with the other devices, so that logical layering of the network can be achieved based on multiple instances.

The embodiments above provide a solution to network logical layering based on multiple topologies, and a solution to network logical layering based on multiple instances. It should be understood that logical layering of a network may also be performed with a combination of the solutions of the embodiments, that is, may be performed based on both multiple instances and multiple topologies.

In an embodiment, the network devices in the network also exchanges LIE packets and TIE packets; and, in order to perform network logical layering based on both multiple instances and multiple topologies, the LIE packet sent by the network device not only includes the topology ID capable of indicating at least one topology supported by the source device, but also includes the instance ID option. The LIE packet includes the topology ID option to inform the other devices of the topology information of a topology supported by an interface of the network device.

The TIE packet not only includes the neighbor information carrying the target topology ID and the Metric information carrying the target topology ID, but also includes the instance ID option. The Node TIE packet supports the neighbor option carrying the topology ID to inform a remote end of the neighbor information of the present device in a certain topology; and the Node TIE packet and the Prefix TIE packet include the Metric information carrying the topology ID to inform the other devices in the network of the Metric information of the present device in the corresponding topology.

In an example, in order to send the LIE packet and the TIE packet as described above to the other devices, the network device can bind a certain instance supported thereby and a certain topology in the instance to an interface of the network device, so that the LIE packet sent through the interface naturally carries a corresponding topology ID option and a corresponding instance ID option, and the TIE packet sent through the interface naturally includes neighbor information carrying a target topology ID, Metric information carrying the target topology ID, and a corresponding instance ID.

After receiving the LIE packets and the TIE packets sent by the other devices in the network, the network device may also screen the received packets first according to the description of the embodiment above to determine the corresponding target LIE packet and the corresponding target TIE packet, and then determine a topology route of each topology in the instance supported by the present device based on the information in the reserved target LIE packet and target TIE packet.

With the RIFT protocol-based network logical layering method according to the embodiment, the LIE packet carries the instance ID option, so that a receiver of the packet can determine whether the instance ID in the packet is consistent with the instance ID of the instance supported by the receiver, and discard the packet without establishing a neighboring relationship if the instance ID in the packet is inconsistent with the instance ID of the supported instance; meanwhile, the TIE packet carries the instance ID option, so that a receiver of the packet can determine whether the packet is sent by a neighbor in the instance supported by the receiver, and discard the packet if the packet is not sent by the neighbor. By using different packets between the instances, it is allowed to independently determine a topology route in each instance when two or more instances exist in the network.

Furthermore, by adding the topology ID capable of indicating the topology supported by the source device to the LIE packet and carrying the topology ID of the supported topology by the neighbor information and the Metric information in the TIE packet, the other devices in the network can know the topology supported by the present device and know the neighbor information and the Metric information of the present device in the supported topology, so that logical layering of the network can be achieved based on multiple topologies, thereby optimizing the allocation of network communication resources.

Figure 9:
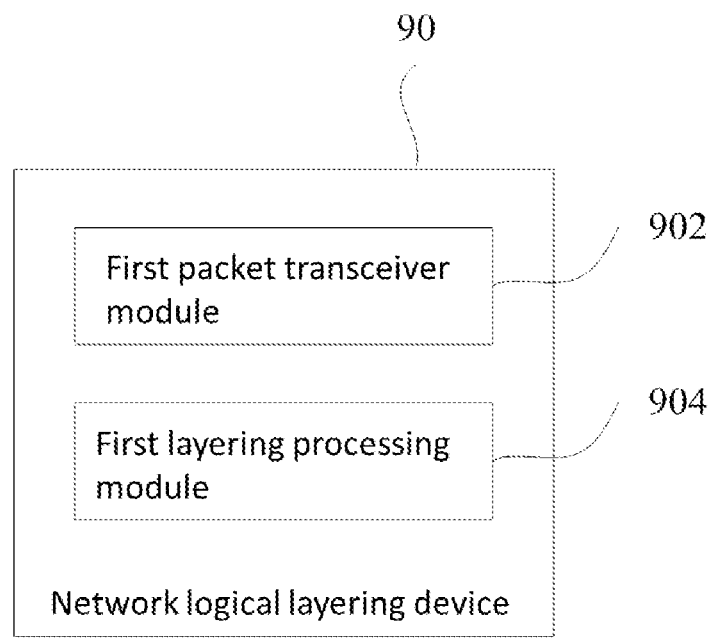
FIG. 9 is a schematic structural diagram of a network logical layering device according to an embodiment of the present disclosure.

An embodiment provides a network logical layering device. FIG. 9 is schematic structural diagram of a network logical layering device 90.

The network logical layering device 90 includes a first packet transceiver module 902 and a first layering processing module 904. The first packet transceiver module 902 is configured to send an LIE packet and a TIE packet to other devices in a network, and receive LIE packets and TIE packets sent by the other devices in the network; the LIE packet is capable of indicating a topology ID of at least one topology supported by a source device which sends the packet, the TIE packet includes neighbor information carrying a target topology ID and Metric information carrying the target topology ID, and the target topology ID is a topology ID indicated by an LIE packet corresponding to the TIE packet. The first layering processing module 904 is configured to perform network logical layering based on the LIE packets and the TIE packets received by a present device.

The network logical layering device 90 may be deployed in a network device, with the function of the first transceiver module 902 implemented by a communication unit and a processor of the network device, and the function of the first layering processing module 904 implemented by the processor of the network device. The network logical layering device 90 can perform the RIFT protocol-based network logical layering methods described in the embodiments above. The specific implementations of the RIFT protocol-based network logical layering methods may be referred to the description of the above embodiments, and thus are not repeated here.

Figure 10:
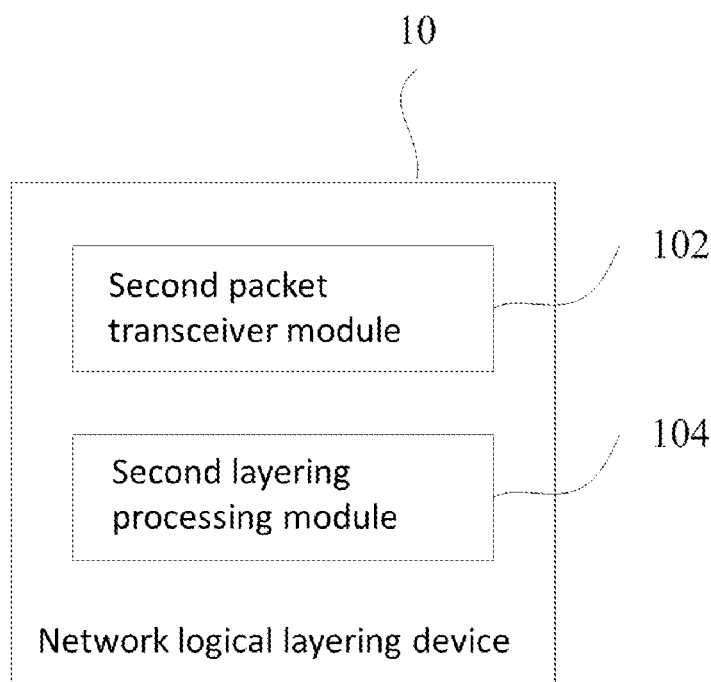
FIG. 10 is a schematic structural diagram of a network logical layering device according to an embodiment of the present disclosure.

The embodiment further provides a network logical layering device as shown in a schematic structural diagram in FIG. 10.

The network logical layering device 10 includes a second packet transceiver module 102 and a second layering processing module 104. The second packet transceiver module 102 is configured to send an LIE packet and a TIE packet to other devices in a network, and receive LIE packets and TIE packets sent by the other devices in the network; each of the LIE packet and the TIE packet includes an instance ID option which carries an instance ID of at least one instance supported by a source device which sends the packet and a topology ID of at least one topology in the instance. The second layering processing module 104 is configured to perform network logical layering based on the LIE packets and the TIE packets received by a present device.

The network logical layering device 10 may also be deployed in a network device, with the function of the second packet transceiver module 102 implemented by a communication unit and a processor of the network device, and the function of the second layering processing module 104 implemented by the processor of the network device. The network logical layering device 10 can perform the RIFT protocol-based network logical layering methods described in the embodiment above. The specific implementations of the RIFT protocol-based network logical layering methods may be referred to the description of the above embodiments, and thus are not repeated here By extending the LIE packet and the TIE packet, the network logical layering device according to the embodiment can achieve logical layering of a network based on multiple topologies and/or multiple instances, thereby facilitating to improve the utilization of network communication resources through self-topology and optimizing resource allocation.

An embodiment provides a computer-readable storage medium, on which one or more computer programs that can be read, compiled and executed by one or more processors are stored. In the embodiment, the computer-readable storage medium may store one of a first network logical layering program and a second network logical layering program thereon. The first network logical layering program can be executed by the one or more processors to perform a process of any one of the RIFT protocol-based network logical layering methods described in the embodiments above. The second network logical layering program can be executed by the one or more processors to perform a process of any one of the RIFT protocol-based network logical layering methods described in the embodiments above.

Figure 11:
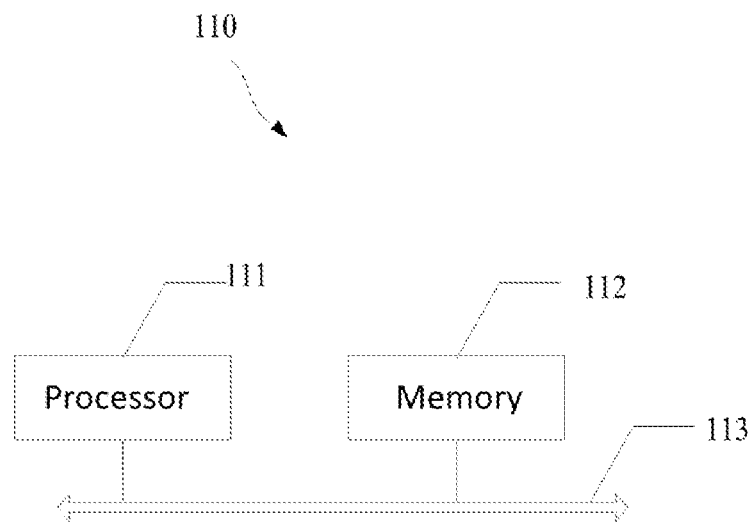
FIG. 11 is a schematic diagram of a hardware structure of a network device according to an embodiment of the present disclosure.

The embodiment further provides a network device, as shown in FIG. 11, the network device 110 includes a processor 111, a memory 112, and a communication bus 113 configured to connect the processor 111 with the memory 112. The memory 112 may be the above computer-readable storage medium having the first network logical layering program and/or the second network logical layering program stored thereon. The processor 111 can read, compile and execute the first network logical layering program to perform the processes of the RIFT protocol-based network logical layering methods described in the embodiments above.

The processor 111 may send an LIE packet and a TIE packet to other devices in the network, and receives LIE packets and TIE packets sent by the other devices in the network. Then, a topology route corresponding to a topology supported by the present device is determined based on the LIE packets and the TIE packets received by the present device, so as to realize topology-based logical layering of the network.

The LIE packet is capable of indicating a topology ID of at least one topology supported by a source device which sends the packet, the TIE packet includes neighbor information carrying a target topology ID and Metric information carrying the target topology ID, and the target topology ID is a topology ID indicated by an LIE packet corresponding to the TIE packet.

The processor 111 may bind the topology supported by the network device 110 to an interface of the network device 110, and send the LIE packet and the TIE packet to the other devices in the network through the interface.

In some implementations, the TIE packet sent by the processor 111 includes a Node TIE packet containing the neighbor information carrying the target topology ID, and a Prefix TIE packet containing the Metric information carrying the target topology ID.

The processor 111 may also read, compile and execute the second network logical layering program to perform the processes of the RIFT protocol-based network logical layering methods described in the embodiments above.

The processor 111 may send an LIE packet and a TIE packet to the other devices in the network, and receives LIE packets and TIE packets sent by the other devices in the network. Each of the LIE packet and the TIE packet includes an instance ID option which carries an instance ID of at least one instance supported by the source device. After receiving the LIE packets and the TIE packets from the other devices, the processor 111 performs network logical layering based on the LIE packets and the TIE packets received by the present device.

In some implementations, the processor 111 may bind the instance supported by the present device to an interface of the present device, and send the LIE packet and the TIE packet to the other devices in the network through the interface.

In addition, when the processor 111 determines a topology route corresponding to each topology in the instance supported by the present device based on the LIE packets and the TIE packets received by the present device, the processor 111 may screen the received LIE packets and TIE packets, and reserve a target LIE packet and a target TIE packet. The target LIE packet is an LIE packet which carries an instance ID the same as an instance ID of the instance bound to the interface that receives the packet, and the target TIE packet is a TIE packet which carries an instance ID the same as an instance ID of the instance bound to the interface that receives the packet, and is sent by a neighboring device of the present device under the instance ID. After the screening, the processor 111 performs network logical layering based on the target LIE packet and the target TIE packet.

The processor 111 of the network device 110 executes at least one of the first network logical layering program and the second network logical layering program to implement the RIFT protocol-based network logical layering method. The other details of the implementation may be referred to the description of the above embodiments, and thus are not repeated here.

Figure 12:
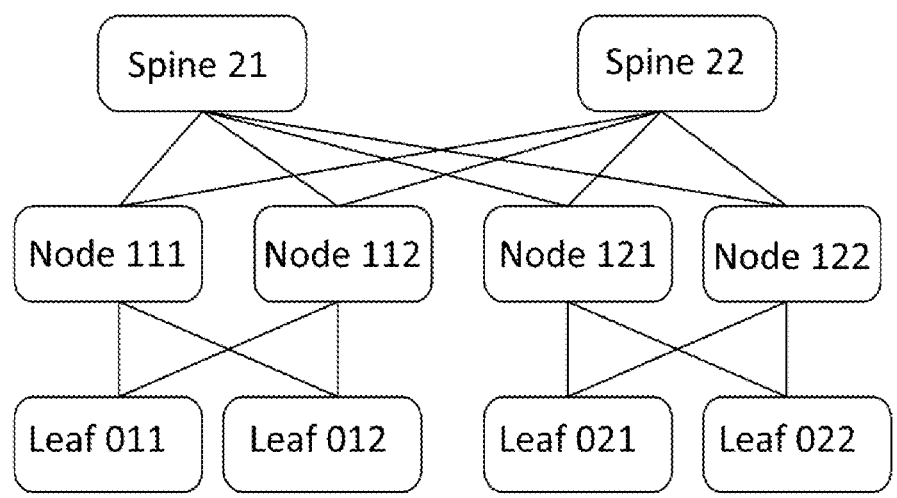
FIG. 12 is a schematic diagram of an RIFT network architecture according to an embodiment of the present disclosure.

In order to enable those of ordinary skill in the art to know more about the advantages and the details of the solution to route determination described in the above embodiments, the solution to route determination is further described in an embodiment with reference to specific examples and the RIFT network architecture shown in FIG. 12.

Example 1—implementation of network logical layering based on multiple topologies Description of Extensions Made to an RIFT Protocol Packet For an LIE Packet A topology ID option, the structure of which is shown in FIG. 3, is newly added to the LIE packet. In the embodiment, if an LIE packet sent by a certain network device does not carry any topology ID option, it is indicated that the network device only supports a default topology.

For a TIE Packet

Neighbor information carrying a topology ID may be newly added to the TIE packet, and is carried through the neighbor option shown in FIG. 4, for example. In FIG. 4, "Neighbor structure" is a neighbor structure specified by the RIFT protocol and is configured to characterize a neighbor. It should be understood that one TIE packet may carry a plurality of neighbor options.

Meanwhile, Metric information carrying the topology ID may be newly added to the TIE packet, and is carried through the Metric option shown in FIG. 5, for example. Similarly, one TIE packet may carry a plurality of Metric options.

Description of Packet Transmission

The network device may bind an interface thereof to a specific topology by configuring commands or with other methods.

For example, in a network shown in FIG. 12, assuming that a Node 111, a Node 122 and a Spine 22 do not support a multicast function (e.g. an IPv4 multicast function), a topology ID of a multicast topology is "1", and all the nodes shown in FIG. 12 support a topology 0 by default.

A Leaf 011 binds all other interfaces thereof except the interface connected with the Node 111 to the topology 1; a Leaf 012 binds all other interfaces thereof except the interface connected with the Node 111 to the topology 1; a Leaf 021 binds all other interfaces thereof except the interface connected with the Node 122 to the topology 1; and a Leaf 022 binds all other interfaces thereof except the interface connected with the Node 122 to the topology 1.

A Node 112 binds all other interfaces thereof except the interface connected with the Spine 22 to the topology 1; and a Node 121 binds all other interfaces thereof except the interface connected with the Spine 22 to the topology 1.

A Spine 21 binds all other interfaces thereof except the interfaces connected with the Node 111 and the Node 122 to the topology 1.

After all the nodes in the network bind the interfaces to the topology 1, the LIE packets sent through the interfaces carry topology ID options, and the topology IDs in the topology ID options are "1". The Node TIE packets sent through the interfaces contain neighbor options carrying the topology IDs of "1", and the Node TIE packets and the Prefix TIE packets contain Metric options carrying the topology IDs of "1".

Description of Route Determination

In the example, all the nodes support the default topology 0, and some of the nodes support the topology 1 at the same time, so that the nodes supporting the topology 1 calculate topology routes for the topology 1 to be used for multicast routing and forwarding, while the interfaces which are not bound to the topology 1 do not participate in the calculation of the topology routes.

Example 2—implementation of network logical layering based on multiple instances Description of extensions made to an RIFT protocol packet For an LIE Packet An instance ID option, the structure of which is shown in FIG. 7, is newly added to the LIE packet. In the embodiment, if an LIE packet sent by a certain network device does not carry any instance ID option, it is regarded by default that the network device only supports a default instance (an instance 0).

For a TIE Packet

The instance ID option shown in FIG. 7 is also newly added to the TIE packet.

Description of Packet Transmission

The network device may bind an interface thereof to a specific instance by configuring commands or with other methods.

For example, in the network shown in FIG. 12, assuming that five nodes, namely the Leaf 011, the Node 111, the Spine 21, the Node 121 and the Leaf 021, support a Topology 1 in an Instance 1, each of the five nodes may bind any one of the interfaces thereof connected with the other four nodes to the Topology 1 in the Instance 1. Then, both the LIE packets and the TIE packets sent through these interfaces carry instance ID options which carry the instance IDs of "1" and the topology IDs of "1".

Description of Packet Reception

After receiving the LIE packet, the network device discards the packet if it is determined that the instance ID carried by the LIE packet is not consistent with the instance ID bound to the interface which receives the LIE packet.

For the received TIE packet, the network device determines whether the instance ID carried by the TIE packet is consistent with the instance ID bound to the interface which receives the TIE packet, and further determines whether the TIE packet is sent by a neighbor of the present device in the instance when it is determined that t the instance ID carried by the TIE packet is consistent with the instance ID bound to the interface which receives the TIE packet, or discards the packet when it is determined that the instance ID carried by the TIE packet is inconsistent with the instance ID bound to the interface which receives the TIE packet. If it is determined that the instance ID carried by the TIE packet is consistent with the instance ID bound to the interface which receives the TIE packet and the TIE packet is sent by the neighbor of the present device, the TIE packet is flooded to the neighbors in the same instance according to a TIE flooding rule.

Description of Route Determination

After receiving the LIE packets and the TIE packets sent by the other devices, the network device can calculate a topology route for each instance and each topology supported by the network device.

Example 3—implementation of network logical layering based on multiple topologies and multiple instances.

Description of Extensions Made to an RIFT Protocol Packet

The extensions made to the protocol in the example are a combination of the extensions described in the Examples 1 and 2. The details may be referred to the above description, and thus are not repeated here.

Description of Packet Transmission

The network device may bind an interface thereof to a specific topology in a specific instance by configuring commands or with other methods.

For example, in the network shown in FIG. 12, assuming that the Leaf 011 binds all the interfaces thereof to a Topology 1 and a Topology 2 in an Instance 1, with the interface binding relationship of the Leaf 011 recorded as "1.1+1.2";

the Leaf 012 binds all the interfaces thereof to a Topology 1 and a Topology 2 in an Instance 2, with the interface binding relationship of the Leaf 012 recorded as "2.1+2.2";

the Node 111 binds all the interfaces thereof to the topologies 1 and 2 in the Instance 1, with the interface binding relationship of the Node 111 recorded as "1.1+1.2"; and the Node 112 binds all the interfaces thereof to the topology 2 in the Instance 2, with the interface binding relationship of the Node 112 recorded as "2.2".

Then, each node sends the LIE packet and the TIE packet through the corresponding interface, so that the LIE packet sent carries a corresponding topology ID option and a corresponding instance ID option, and the TIE packet sent includes a neighbor option carrying a corresponding topology ID and a Metric option carrying the corresponding topology ID, and carries the corresponding instance ID option at the same time.

Description of Packet Reception

After receiving the LIE packets and the TIE packets from the other network devices, each network device may screen and forward the packets according to the description of the Example 2. The specific processes of the screening and forwarding may be referred to the description of the above example, and thus are not repeated here.

Description of Route Determination

In the example, since the instances and the topologies supported by the Leaf 011 and the Node 111 are completely the same, the Leaf 011 and the Node 111 can establish a normal neighbor relationship therebetween, exchange TIE packets normally, and calculate two routes for the topology 1 and the topology 2 in the Instance 1 respectively.

Since the instance supported by the Leaf 011 is different from that supported by the Node 112, the Leaf 011 and the Node 112 cannot establish a neighbor relationship therebetween.

Similarly, since the instance supported by the Leaf 012 is different from that supported by the Node 111, the Leaf 012 and the Node 111 cannot establish a neighbor relationship therebetween.

Since the instances supported by the Leaf 012 and the Node 112 are the same, the Leaf 012 and the Node 112 can normally establish a neighbor relationship therebetween and exchange TIE packets. Meanwhile, both the Leaf 012 and the Node 112 support the Topology 2, and thus can calculate a route for the Topology 2 normally, but the Node 112 cannot calculate a route for the Topology 1 because the Node 112 does not support the Topology 1.

In the present disclosure, the technical features in the embodiments may be combined and used in one embodiment if no conflict is incurred.

It should be understood by those of ordinary skill in the art that all or some of the steps in the methods, the functional modules/units in, the systems, and the devices disclosed above may be implemented as software (implemented by program codes capable of being executed by a computing device), firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, and is executed by a computing device. In some cases, the steps illustrated or described herein may be performed in an order different from that described here. The computer-readable medium may include computer storage medium (or non-transitory medium) and communication medium (or transitory medium). As well known by those of ordinary skill in the art, the term "computer storage medium" includes volatile/nonvolatile and removable/non-removable medium used in any method or technology for storing information (such as computer-readable instructions, data structures, program modules and other data). The computer storage medium include, but are not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. In addition, it is well known by those of ordinary skill in the art that the communication medium generally includes computer-readable instructions, data structures, program modules or other data in a modulated data signal, such as a carrier wave or other transmission mechanism, and may include any information delivery medium. Therefore, the present disclosure is not limited to any specific combination of hardware and software.

What is claimed is:

1. A network logical layering method based on Routing In Fat Tree (RIFT) protocol, comprising:
sending a Link Information Element (LIE) packet and a Topology Information Element (TIE) packet to other devices in a network, and receiving LIE packets and TIE packets sent by the other devices in the network; wherein the LIE packet indicates a topology identifier (ID) of at least one topology supported by a source device which sends the LIE packet, the TIE packet comprises neighbor information carrying a target topology ID and Metric information carrying the target topology ID, and the target topology ID is the topology ID indicated by the LIE packet corresponding to the TIE packet; and
performing network logical layering based on the LIE packets and the TIE packets received by a present device;
wherein the other devices refer to devices except the present device,
each of the LIE packet and the TIE packet further comprises an instance ID option which carries an instance ID of at least one instance supported by the source device and the topology ID of at least one topology in the supported instance, and
the performing network logical layering based on the LIE packets and the TIE packets received by the present device comprises:
screening the received LIE packets and TIE packets, and reserving a target LIE packet and a target TIE packet, wherein the target LIE packet is the LIE packet which carries the instance ID the same as that bound to an interface that receives the LIE packet, and the target TIE packet is the TIE packet which carries the instance ID the same as that bound to an interface that receives the TIE packet, and is sent by a neighboring device of the present device under the instance ID; and
performing network logical layering based on the target LIE packet and the target TIE packet.

2. The method of claim 1, wherein the sending the LIE packet and the TIE packet to the other devices in the network comprises:
binding the topology supported by the present device to an interface of the present device; and
sending the LIE packet carrying the topology ID of at least one topology supported by the present device to the other devices in the network through the interface, and sending the TIE packet to the other devices in the network through the interface, wherein the TIE packet comprises the neighbor information carrying the target topology ID and the Metric information carrying the target topology ID.

3. The method of claim 1, wherein, in response to that the source device supports other topologies in addition to a default topology, the LIE packet carries a topology ID of at least one of the other topologies supported by the source device.

4. The method of claim 1, wherein the TIE packet comprises a Node TIE packet and a Prefix TIE packet; and the Node TIE packet comprises the neighbor information carrying the target topology ID, and the Node TIE packet and the Prefix TIE packet comprise the Metric information carrying the target topology ID.

5. The method of claim 1, wherein the sending the LIE packet and the TIE packet to the other devices in the network comprises:
binding the instance supported by the present device to an interface of the present device; and
sending the LIE packet and the TIE packet to the other devices in the network through the interface.

6. A network logical layering method based on RIFT protocol, comprising:
sending an LIE packet and a TIE packet to other devices in a network, and receiving LIE packets and TIE packets sent by the other devices in the network; wherein each of the LIE packet and the TIE packet comprises an instance ID option which carries an instance ID of at least one instance supported by a source device that sends the LIE packet and the TIE packet; and
performing network logical layering based on the LIE packets and the TIE packets received by a present device;
wherein the other devices refer to devices except the present device,
the performing network logical layering based on the LIE packets and the TIE packets received by the present device comprises:
screening the received LIE packets and TIE packets, and reserving a target LIE packet and a target TIE packet, wherein the target LIE packet is the LIE packet which carries the instance ID the same as that bound to an interface that receives the LIE packet, and the target TIE packet is the TIE packet which carries the instance ID the same as that bound to an interface that receives the TIE packet, and is sent by a neighboring device of the present device under the instance ID; and
performing network logical layering based on the target LIE packet and the target TIE packet.

7. The method of claim 6, wherein the sending the LIE packet and the TIE packet to the other devices in the network comprises:
binding the instance supported by the present device to an interface of the present device; and
sending the LIE packet carrying a topology ID of at least one topology supported by the present device to the other devices in the network through the interface, and sending the TIE packet to the other devices in the network through the interface, wherein the TIE packet comprises neighbor information carrying a target topology ID and Metric information carrying the target topology ID.

8. The method of claim 6, wherein at least two topologies exist in the network; the LIE packet further comprises a topology ID of at least one topology supported by the source device which sends the LIE packet, the TIE packet comprises the neighbor information carrying a target topology ID and the Metric information carrying the target topology ID, and the target topology ID is the topology ID indicated by the LIE packet corresponding to the TIE packet.

9. The method of claim 8, wherein the sending the LIE packet and the TIE packet to the other devices in the network comprises:

binding the topology supported by the device to an interface of the present device; and sending the LIE packet carrying the instance ID option of the present device and the TIE packet carrying the instance ID option of the present device to the other devices in the network through the interface.

10. The method of claim 8, wherein the TIE packet comprises a Node TIE packet and a Prefix TIE packet; and the Node TIE packet comprises the neighbor information carrying the target topology ID, and the Node TIE packet and the Prefix TIE packet comprise the Metric information carrying the target topology ID.

11. A network device, comprising a processor, a memory and a communication bus;

the communication bus is configured to enable connection and communication between the processor and the memory; and the processor is configured to execute a first network logical layering program stored in the memory, so as to perform the RIFT protocol-based network logical layering method of claim 1.

12. A non-transitory computer-readable storage medium having a first network logical layering program stored thereon, wherein the first network logical layering program is capable of being executed by one or more processors to perform the RIFT protocol-based network logical layering method of claim 1.

13. A network device, comprising a processor, a memory and a communication bus;

the communication bus is configured to enable connection and communication between the processor and the memory; and the processor is configured to execute a second network logical layering program stored in the memory, so as to perform the RIFT protocol-based network logical layering method of claim 6.

14. A non-transitory computer-readable storage medium having a second network logical layering program stored thereon, wherein the second network logical layering program is capable of being executed by one or more processors to perform the RIFT protocol-based network logical layering method of claim 6.

* * * * *